US009559478B2

(12) United States Patent
Jaramillo

(10) Patent No.: US 9,559,478 B2
(45) Date of Patent: Jan. 31, 2017

(54) CABLE CRIMP AND TRIM DEVICE

(71) Applicant: EchoStar Technologies L.L.C., Englewood, CO (US)

(72) Inventor: Harold Jaramillo, Castle Rock, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 340 days.

(21) Appl. No.: 14/231,183

(22) Filed: Mar. 31, 2014

(65) Prior Publication Data

US 2015/0280385 A1 Oct. 1, 2015

(51) Int. Cl.
*B23P 19/00* (2006.01)
*H01R 43/00* (2006.01)
*H01R 43/042* (2006.01)

(52) U.S. Cl.
CPC ...... *H01R 43/0421* (2013.01); *Y10T 29/49192* (2015.01)

(58) Field of Classification Search
CPC ................. H01R 43/0421; H01R 43/01; Y10T 29/49192; Y10T 29/53222; Y10T 29/53257
USPC ............ 29/747, 750, 758, 857, 867; 72/326, 72/409.01; 439/392, 418
See application file for complete search history.

(56) References Cited

U.S. PATENT DOCUMENTS 4,246,771 A * 1/1981 Covill ................ H01R 43/0421 29/753
6,017,237 A * 1/2000 Sullivan ................. H01R 43/01 439/392

* cited by examiner

*Primary Examiner* — Donghai D Nguyen
(74) *Attorney, Agent, or Firm* — Seed Intellectual Property Law Group LLP

(57) ABSTRACT

A crimp tool for concurrently crimping and trimming includes a first jaw member and a second jaw member pivotally coupled to the first and second jaw members moveable between a crimp position and a release position. The crimp tool also includes a first crimp die coupled to the first jaw member and having a first recessed surface and a second crimp die coupled to the second jaw member and having a second recessed surface, the first and second recessed surfaces being complementary to each other and forming a crimping opening in the crimp position to receive a connector having a conductor received therein. The crimp tool includes cutting members that are spaced apart relative to the respective jaw members to trim an exposed inner conductor of the conductor when substantially abutting one another in the crimp position, and may be adjustable depending on the desired protrusion of the inner conductor.

12 Claims, 7 Drawing Sheets

Fig. 6A.
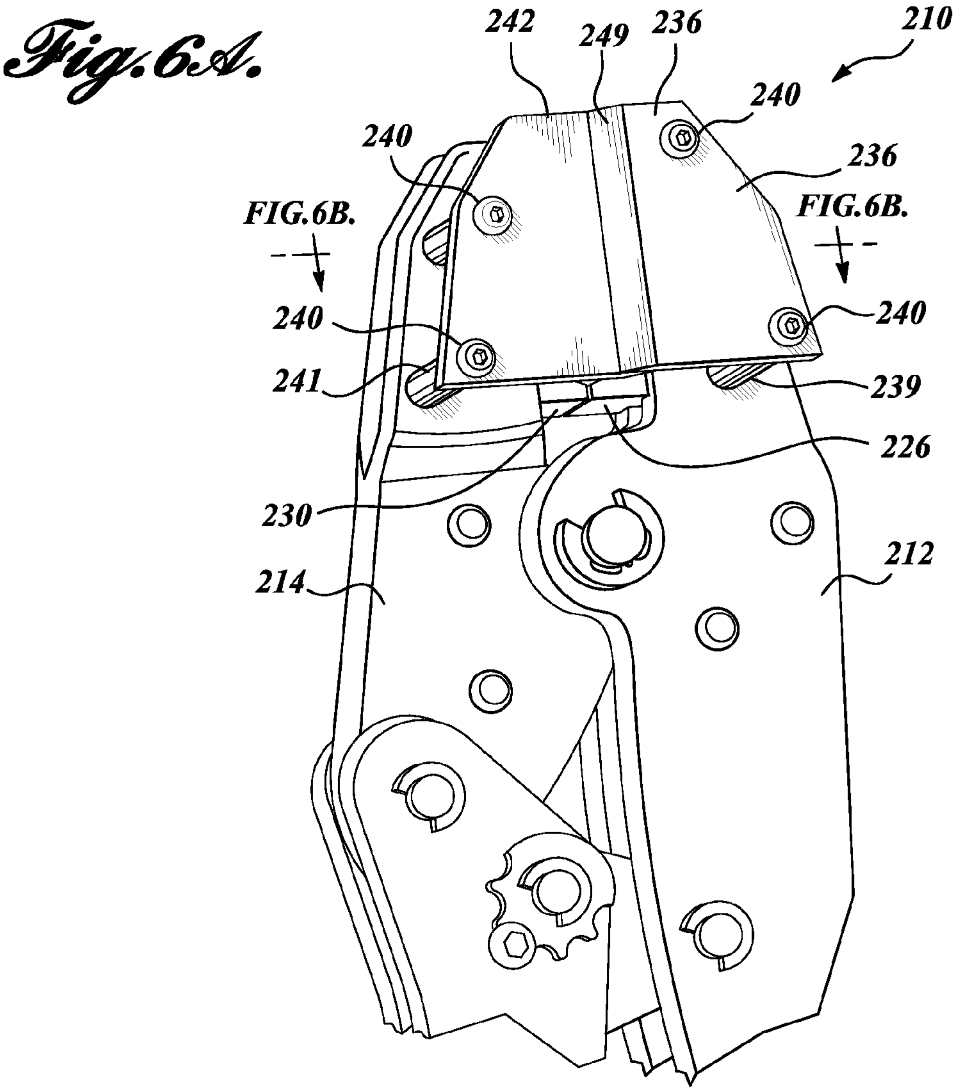
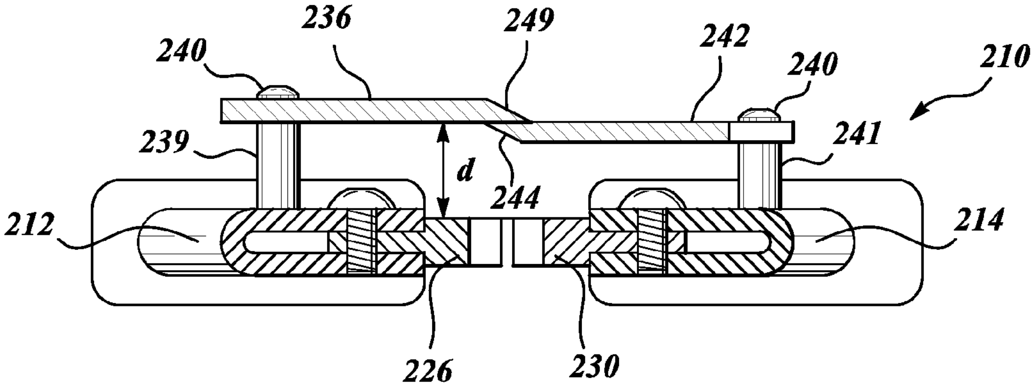
Fig. 6B.

CABLE CRIMP AND TRIM DEVICE

BACKGROUND

Technical Field

The present disclosure generally relates to crimp tools and, more particularly, to a multi-functional crimp tool for crimping connectors to electrical cables and trimming the cable in a single crimp step.

Description of the Related Art

Various tools are used to crimp a connector to an electrical cable, such as a coaxial cable. The cables are mechanically and electrically secured to a connector by crimping a portion of the connector over the cable.

A crimping operation typically includes stripping one or more outer layer(s) of an insulator from the cable in order to expose an inner electrical conductor, such as a copper wire or a copper plated steel wire, for example. The inner conductor is exposed so that it conducts electrical signals when mated with a female receiving element. After stripping the outer layer(s) of the insulator, the connector is generally inserted through the cable, with the inner conductor protruding therefrom. The cable is then compressed at a lower portion of the connector to form a crimped joint.

However, sizing the length of the outer insulation layer(s) to be stripped to expose a precise length of the inner conductor has been problematic. For example, a longer protrusion of the inner conductor may damage a solder joint or the connector itself when mated with the female receiving element. Further, to maintain a proper length of the protrusion of the inner conductor may require a user to measure the length of the protrusion and then use cutters or scissors to cut a portion of the additional length of the protrusion. Such additional steps promote inefficiencies and involve time-consuming tasks.

BRIEF SUMMARY

The present disclosure describes various embodiments of crimp tools and related methods with robust and efficient form factors that enable crimping connectors to electrical cables and concurrently trimming electrical cables in a single step. The various embodiments of crimp tools and related methods improve cost and time efficiencies associated with crimping a connector to a coaxial cable while in the same sequence of steps, trimming exposed inner conductors of cables to the exact length needed for that particular usage. In other aspects, the various embodiments of crimp tools and related methods promote cost and time efficiencies by enabling users to selectively trim off inner conductors of cables to achieve precise protrusions thereof.

For example, a crimp tool according to one embodiment includes a first jaw member and a second jaw member pivotally coupled to the first jaw member along a pivot axis. The first and second jaw members are moveable between a crimp position and a release position. The crimp tool may include a first crimp die coupled to the first jaw member and having a first recessed surface and a second crimp die coupled to the second jaw member and having a second recessed surface. The first and second recessed surfaces may be complementary to each other to form a crimping opening in the crimp position to receive a connector having a cable received therein. The crimp tool further includes a first cutting member coupled to at least one of the first crimp die or the first jaw member and a second cutting member coupled to at least one of the second crimp die or the second jaw member. The first and second cutting members are spaced apart from the respective first and second jaw members such that the first and second cutting members are configured to trim an exposed inner conductor of the cable when the jaw members are substantially abutting one another in the crimp position. In this manner, users may advantageously crimp and trim a cable in a single step.

According to other embodiments, the crimp tool may further include a plurality of spacers coupling the first and second cutting members to the respective first and second crimp dies. The plurality of spacers are selected to achieve a desired spacing between the first and second cutting members relative to the respective first and second crimp dies or the first and second jaw members. In this manner, users may advantageously trim off excess lengths of inner conductors of cable wires to achieve precise protrusions thereof for each particular application.

According to other embodiments, a crimp tool to crimp a connector having a coaxial cable received therein includes a first jaw member and a second jaw member pivotally coupled to the first jaw member at a pivot axis. The first and second jaw members are moveable between a crimp position and a release position. The crimp tool includes a first crimp die coupled to the first jaw member, the first crimp die having a plurality of first recessed surfaces and a second crimp die coupled to the second jaw member, the second crimp die having a plurality of second recessed surfaces. The pluralities of the first and second recessed surfaces are complementary to each other and form a plurality of crimping openings for receiving a variety of connectors having received therein coaxial cables of varying gauges. The crimp tool further includes a first cutting member coupled to at least one of the first crimp die or the first jaw member and a second cutting member coupled to at least one of the second crimp die or the second jaw member. The first and second cutting members may be configured to trim an exposed inner conductor of the coaxial cable when the jaws are closed, substantially abutting one another in the crimp position. The crimp tool may further advantageously include an axial adjustment mechanism configured to selectively axially displace the first and second cutting members a selected distance away from the respective first and second jaw members. In this manner, users may advantageously perform concurrent crimping and trimming operations and trim off excess lengths of inner conductors of cable wires to achieve precise protrusions thereof.

According to other embodiments, a crimp tool includes a main body having a plunger, the plunger being moveable to compress a compression connector inserted through an electrical cable and a lever arm operatively coupled to the plunger. The lever arm's pivotal movement moves the plunger to compress the compression connector to form a crimped joint. The crimp tool further includes a first cutting member coupled to the lever arm; and a second cutting member coupled to the main body. The first and second cutting members are configured to trim excess protrusion of an inner conductor of the electric cable when substantially abutting one another, while concurrently compressing the compression connector to form the crimped joint.

According to other embodiments, a method for crimping a connector to an electrical cable includes stripping the electrical cable to at least partially expose an inner conductor, inserting the connector through the electrical cable such that a portion of the inner conductor protrudes therefrom, and crimping the connector to the electrical cable and concurrently trimming a portion of the inner conductor.

BRIEF DESCRIPTION OF THE SEVERAL VIEWS OF THE DRAWINGS

FIG. 6A is a partial isometric view of a crimp tool, according to another embodiment.

FIG. 6B is a cross-sectional view of the crimp tool of FIG. 6A, taken along line 6B-6B.

DETAILED DESCRIPTION

Figure 1:
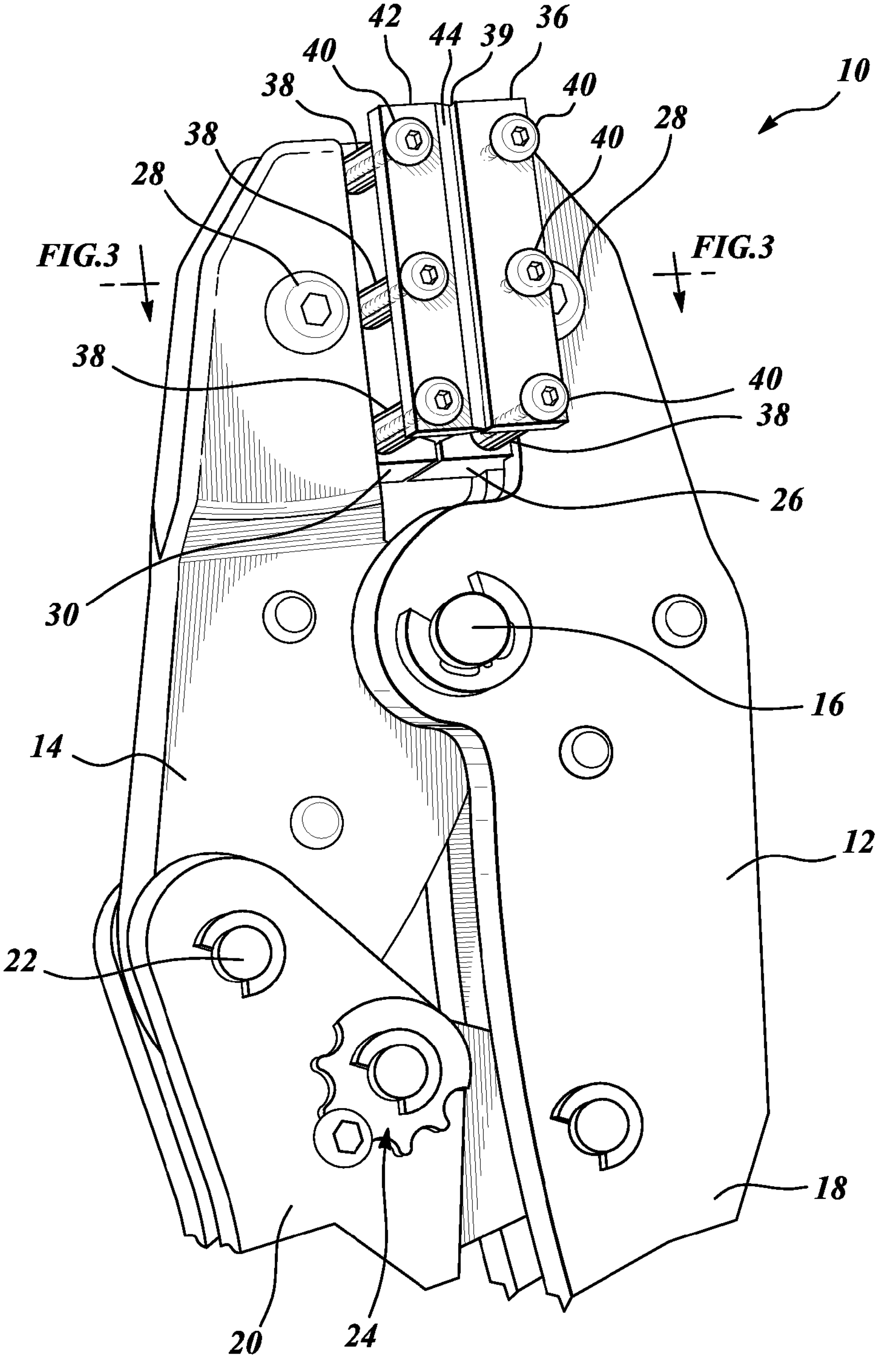
FIG. 1 is a partial isometric view of a crimp tool, according to one embodiment.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with crimp tools have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

FIGS. 1 through 4 illustrate an example embodiment of a crimp tool 10. The crimp tool 10 includes a first jaw member 12 and a second jaw member 14. The first jaw member 12 is pivotally coupled to the second jaw member 14 through a first pivot pin 16. The first pivot pin 16 extends through the first and second jaw members 12, 14 to define an axially extending pivot axis. A lower portion of the first jaw member 12 extends downwardly to define a first handle member 18. Alternatively, in some embodiments, the first handle member 18 may be an additional member that may be rigidly coupled to the first jaw member 12. A lower portion of the second jaw member 14 is pivotally coupled to a second handle member 20 through second pivot pin 22. The first jaw member 12 is generally stationary relative to the second jaw member 14.

The crimp tool 10 also optionally includes a ratchet mechanism 24. The ratchet mechanism 24 is pivotally coupled to the first and second jaw members 12, 14 to provide a ratchet operation in a known manner. The ratchet mechanism 24 allows the crimp tool 10 to be rotated in a set direction, without permitting reverse motion until the full range of motion into a clamping position is obtained. Thereafter, the ratchet mechanism 24 may be released to open the crimp tool 10.

At an upper portion, the first jaw member 12 includes a first crimp die 26 that is coupled to the first jaw member 12. By way of example, the first crimp die 26 may include an elongated portion that is nested within a recess formed in the first jaw member 12. The first crimp die 26 is secured to the first jaw member 12 by fastening means 28, such as a fastener, bolt, etc. In some embodiments, alternate means may be used to secure the first crimp die 26 to the first jaw member 12, such as welding, adhering, etc.

At an upper portion, the second jaw member 14 incudes a second crimp die 30 that is coupled to the second jaw member 14. The second crimp die 30 may include an elongated portion that is nested within a recess formed in the second jaw member 14. The second crimp die 30 is secured to the second jaw member 14 by fastening means 28, such as a fastener, bolt, etc. In some embodiments, alternate means may be used to secure the second crimp die 30 to the second jaw member 14, such as welding, adhering, etc.

Figure 2:
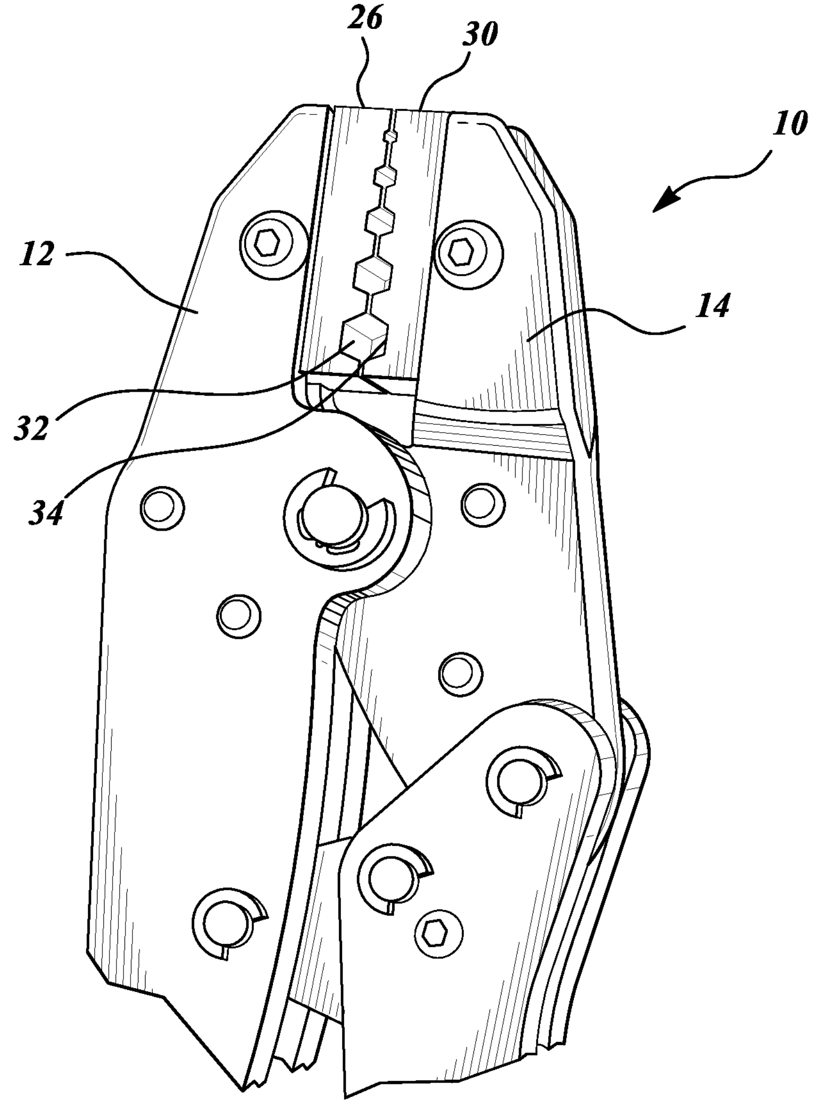
FIG. 2 is a partial rear isometric view of the crimp tool of FIG. 1.

As best illustrated in FIG. 2, at an end open to the exterior, the first crimp die 26 includes a plurality of first recessed surfaces 32. Similarly, the second crimp die 30 also includes a plurality of second recessed surfaces 34 that are complementary to the plurality of first recessed surfaces 32 (i.e., the plurality of second recessed surfaces 34 are a mirror image of the plurality of first recessed surfaces 32 about a substantially central axis of the crimp tool 10). The pluralities of first and second recessed surfaces 32, 34, for example, form a plurality of openings when the crimp dies 26, 30 are abutting one another. The openings generally have a hexagonal profile and are of varying sizes to accommodate work pieces of various sizes, such as connectors and corresponding cables of varying gauges. In alternate embodiments, however, the pluralities of first and second recessed surfaces 32, 34 may form openings of any profile or shape, such as circular, square, etc., and further may be of any size.

The crimp tool 10 can be operated in a crimp position and a release position to crimp a work piece, such as a connector overlying an electrical cable, for example, which is placed between the first and second crimp dies 26, 30 and then release it. More particularly, the work piece is positioned within the plurality of first and second recessed surfaces 32, 34. In the crimp position, as the second handle member 20 is pivotally rotated in a counterclockwise direction about first and second pivot pins 16, 22, the second jaw member 14 and/or the first jaw member 12 are thereby rotated causing the first and second crimp dies 26, 30 to make contact with each other. In this manner, the work piece, such as a connector, positioned within the plurality of first and second recessed surfaces 32, 34 is crimped onto a cable to form a crimped joint. Similarly, in the release position, as the second handle member 20 is pivotally rotated in a clockwise direction about first and second pivot pins 16, 22, the second jaw member 14 and/or the first jaw member 12 are thereby rotated causing the first and second crimp dies 26, 30 to move away from each other.

Figure 3:
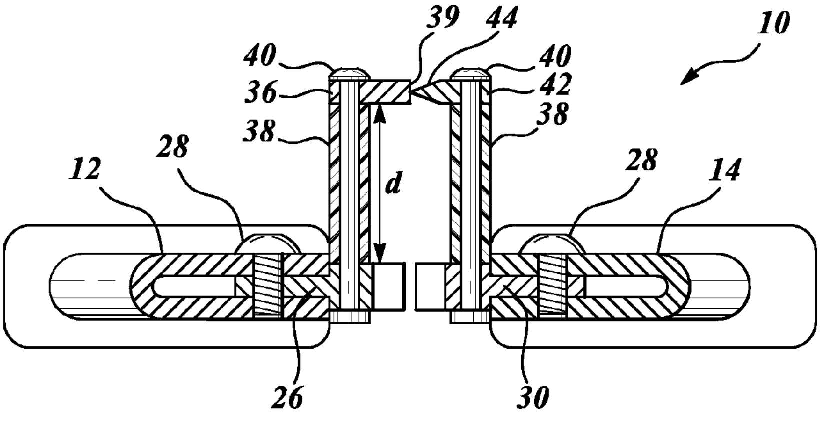
FIG. 3 is a cross-sectional view of the crimp tool of FIG. 1, taken along line 3-3.

Viewing FIGS. 1 and 3 together, at a front side, the crimp tool 10 includes a first cutting member 36 that is coupled to the first crimp die 26 through a plurality of spacers 38. The first cutting member 36 is generally rectangular shaped and includes a blunt edge 39 at a transverse end of the first cutting member 36. The blunt edge 39 is substantially blunt to form a contact surface acting as an anvil when contacted by a cutting edge 44 to perform a cutting or trimming operation, which is discussed in further detail below.

The plurality of spacers 38 are spaced apart from each other in the longitudinal direction (FIG. 1). The spacers 38 are generally annular having respective apertures extending therethrough to receive fasteners 40 to couple the first cutting member 36 to the first crimp die 26. The plurality of spacers 38 may be coupled to the first crimp die 26 by various coupling means, such as welding, adhering, fastening, etc. By way of example, the first crimp die 26 may have tapped apertures to receive corresponding fasteners extending through the first cutting member 36 and the respective spacers 38. Alternatively, the first crimp die 26 may have through holes to receive corresponding fasteners, which may fasten the first cutting member 36 and the respective spacers 38 through corresponding nuts. Further, the first crimp die 26 may alternatively be fabricated of a unitary body of material having the plurality of spacers 38. Still further, while the embodiment illustrated in FIGS. 1 through 4 includes the plurality of spacers 38 coupled to the first crimp die 26, it is appreciated that the plurality of spacers 38 may alternatively be coupled to the first jaw member 12. In this manner, the first cutting member 36 may be coupled to the first jaw member 12 in lieu of coupling to the first crimp die 26.

The crimp tool 10 also includes a second cutting member 42 that is coupled to the second crimp die 30 through the plurality of spacers 38. The second cutting member 42 is generally rectangular shaped and includes a cutting edge 44 at a transverse end of the second cutting member 42. The cutting edge 44 is substantially beveled at opposing surfaces to form a double-beveled cutting surface to perform a cutting or trimming operation when contacted by the blunt edge 39, as best shown in FIG. 3. Moreover, in alternate embodiments, the cutting edge 44 may include only one surface being substantially beveled to form a cutting surface to perform a cutting or trimming operation.

The plurality of spacers 38 for the cutting member 42 are spaced apart from each other in the longitudinal direction (FIG. 1). The spacers 38 are generally annular having respective apertures extending therethrough to receive fasteners 40 to couple the second cutting member 42 to the second crimp die 30. The plurality of spacers 38 may be coupled to the second crimp die 30 by various coupling means, such as welding, adhering, fastening, etc. By way of example, the second crimp die 30 may have tapped apertures to receive corresponding fasteners extending through the second cutting member 42 and the respective spacers 38. Alternatively, the second crimp die 30 may have through holes to receive corresponding fasteners, which may fasten the second cutting member 42 and the respective spacers 38 through corresponding nuts. Further, the second crimp die 30 may alternatively be fabricated of a unitary body of material having the plurality of spacers 38. Again, while the embodiment illustrated in FIGS. 1 through 4 includes the plurality of spacers 38 coupled to the second crimp die 30, it is appreciated that the plurality of spacers 38 may alternatively be coupled to the second jaw member 14. In this manner, the second cutting member 42 may be coupled to the second jaw member 14 in lieu of coupling to the second crimp die 30.

Figure 4A:
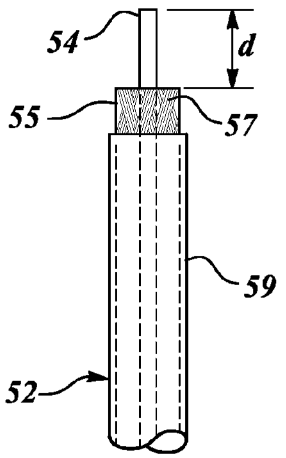
FIG. 4A is partial isometric view of an electrical cable, according to one embodiment.

In the axial direction, the plurality of spacers 38 have a selected height, such that the first and second cutting members 36, 42 are axially spaced apart from the respective first and second crimp dies 26, 30 by the selected distance d. The height of the plurality of spacers 38 is advantageously selected to achieve selected distance d that corresponds to the length of protrusion desired of an inner conductor 54 of an electrical cable. By way of illustration, FIG. 4A illustrates a typical coaxial cable 52 that is prepared for a crimping operation, with the crimp tool removed for clarity of description and illustration. The coaxial cable 52 includes a partially exposed inner conductor 54 protruding therefrom, a tubular insulating layer 55 surrounding the inner conductor 54, a tubular conducting shield 57 surrounding the insulating layer 55, and an outer sheath or jacket 59. The inner conductor 54 protrudes a certain distance d with respect to an exposed surface of the insulating layer 55. The distance d of the inner conductor 54 is precisely selected to mate with the connector it is intended to be used with. An excess length of the inner conductor 54 that may damage the connector or a solder joint of a female receiving element, for example, is avoided, as is a distance d that is too short for proper electrical connections. The height of the plurality of spacers 38 is selected to substantially match the distance d of the specific protrusion desired of the inner conductor 54. The first and second cutting members 36, 42 will be assured to trim off any excess length of the inner conductor 54 while concurrently crimping the connector to the coaxial cable 52. Further, the plurality of spacers 38 may advantageously be selectively removed and replaced with spacers of a desired height. By way of example, various connectors may require varying lengths of the inner conductors to protrude from the electrical cables. The plurality of spacers 38 are easily removed and replaced with spacers of a different height to achieve a desired protrusion of the inner conductor for corresponding connectors. In this manner, the crimp tool 10 may advantageously concurrently form a crimp joint and perform a precise cutting or trimming operation in the crimp position when a work piece is positioned between the first and second crimp dies 26, 30.

Figure 4B:
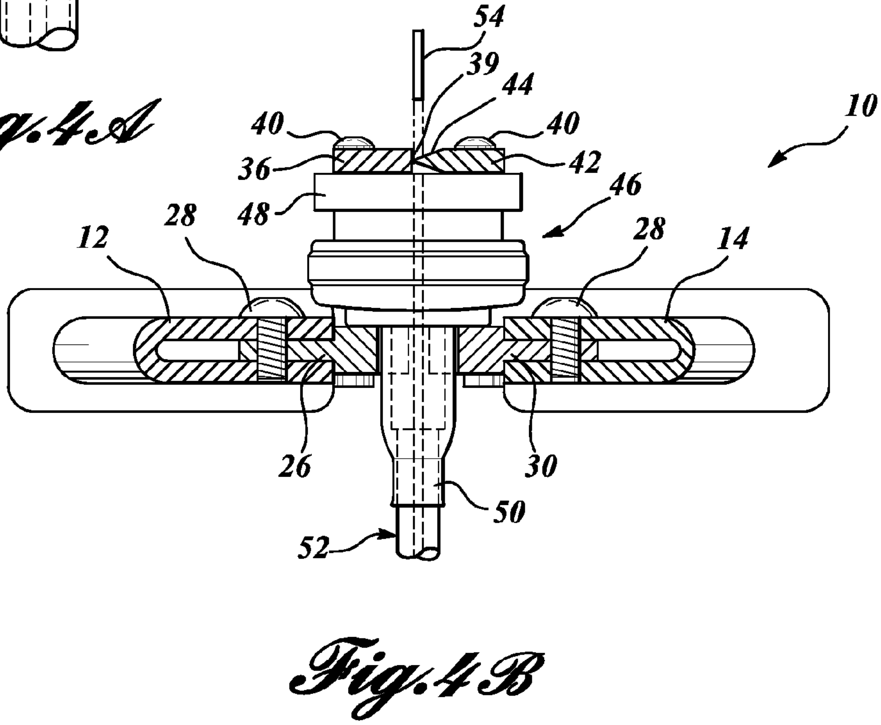
FIG. 4B is the cross-sectional view of FIG. 3, including a connector to be crimped.

By way of illustration, FIG. 4B illustrates a cable connector 46 that is positioned between the first and second crimp dies 26, 30 for a crimping operation. More particularly, the cable connector 46 is positioned within one of the pluralities of first and second recessed surfaces 32, 34 corresponding to the size of the cable connector 46.

The cable connector 46 includes a main body 48 and a ferrule 50, which both overlay the coaxial cable 52. The coaxial cable 52 includes the inner conductor 54 that protrudes therefrom. As discussed in more detail elsewhere, the selected height of the plurality of spacers 38 is sized such that the selected distance d between the first and second cutting members 36, 42 relative to the respective first and second crimp dies 26, 30 avoids interference with the cable connector 46 and trims the inner conductor 54 to achieve the desired protrusion of the inner conductor 54. More particularly, as the second jaw member 14 is rotated in the counterclockwise direction, the second crimp die 30 moves towards the first crimp die 26 and crimps the ferrule 50 over the main body 48 and the coaxial cable 52 to form a crimped joint. The rotation of the second jaw member 14 simultaneously rotates the second cutting member 42 such that the second cutting member 42 trims off any excess length of the inner conductor 54 as the second cutting member 42 abuts or makes contact with the first cutting member 36.

In the embodiment illustrated in FIGS. 1 through 4, the selected height of the plurality of spacers 38 or the selected distance d between the first and second cutting members 36, 42 relative to the respective first and second crimp dies 26, 30 is such that, after the trimming operation, the inner conductor 54 is substantially flush with an upper surface of the main body 48. However, it is appreciated that the selected distance d may be adjusted by adjusting the height of the plurality of spacers 38 such that a portion of the inner conductor 54 may still protrude some distance outwardly from the upper surface of the main body 48. Such a distance may vary from anywhere between 0 to 2 inches, or any other appropriate distance.

While the cable connector 46 illustrated in FIG. 4B is a two-piece connector, it is appreciated that the crimp tool 10 may advantageously crimp and trim other cable connectors or other work pieces. By way of example, the crimp tool 10 may be used to crimp and trim a single-piece cable connector, a three-piece cable connector, or other any other cable connector.

Figure 5:
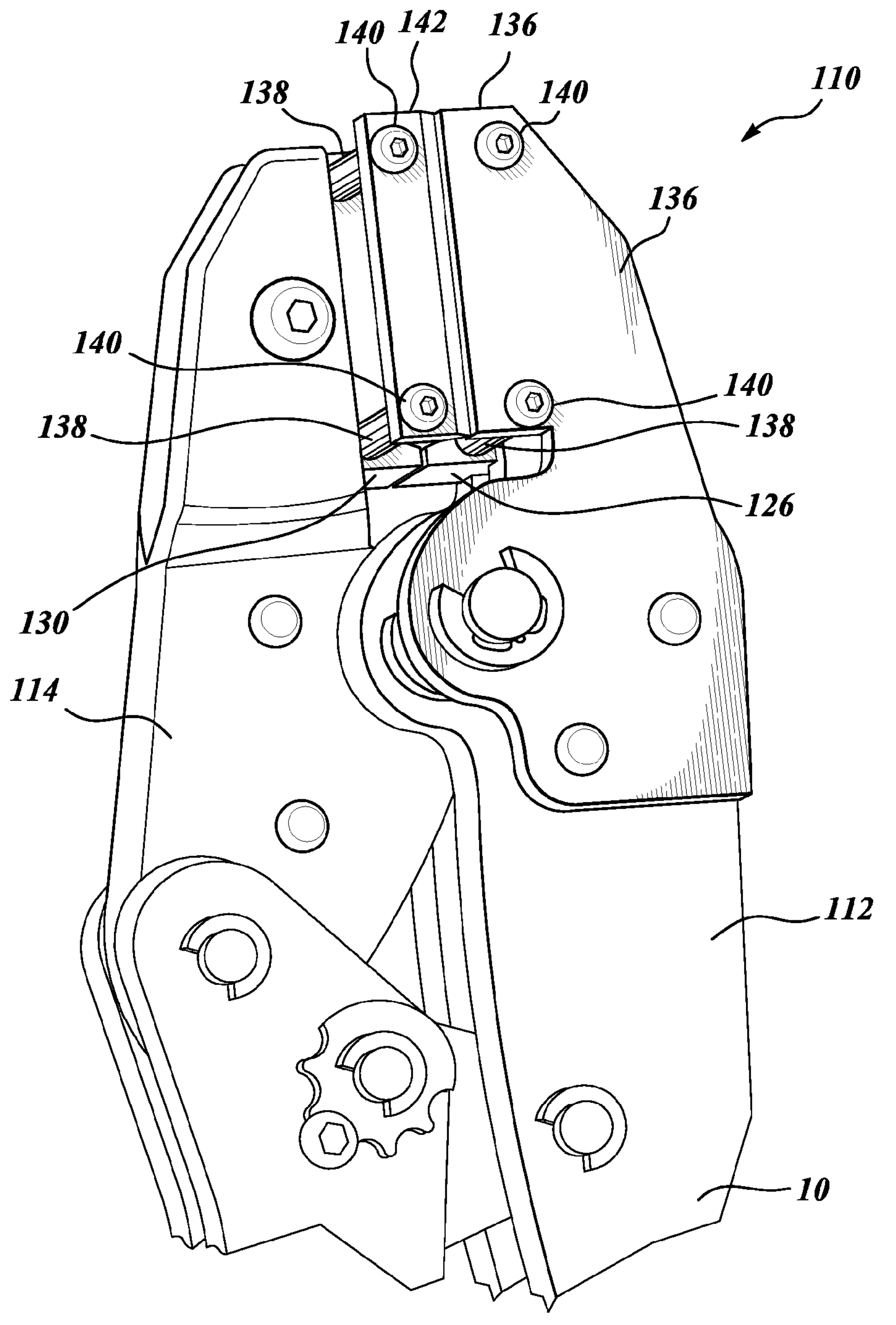
FIG. 5 is a partial isometric view of a crimp tool, according to another embodiment.

FIG. 5 illustrates a crimp tool 110, according to an alternate embodiment. The crimp tool 110 provides a variation in which the first cutting member 136 is elongated and substantially follows the outer profile of an upper portion of the first jaw member 112. The first cutting member 136 is pivotally coupled to the first and second jaw members 112, 114 through a pivot pin 116. The first cutting member 136 is also axially spaced apart from a first crimp die 126 through a pair of spacers 138 by a selected distance and is coupled to the first crimp die 126 through fasteners 140. Similarly, a second cutting member 142 is also axially spaced apart from a second crimp die 130 through a pair of spacers 138 by the selected distance and is coupled to the second crimp die 130 through fasteners 140.

FIGS. 6A and 6B illustrate a crimp tool 210, according to another alternate embodiment. Again, the crimp tool 210 provides a variation in which the first cutting member 236 is elongated and substantially follows the outer profile of an upper portion of the first jaw member 212. Similarly, a second cutting member 242 is also elongated and substantially follows the outer profile of an upper portion of the second jaw member 214. Both the first and second cutting members 236, 242 include respective cutting edges 249, 244 to form respective cutting surfaces. The cutting edges 249, 244 are substantially beveled, with the direction of the respective bevels being in opposite directions.

The first cutting member 236 is axially spaced apart from a first crimp die 226 through a pair of spacers 239 and is coupled to the first jaw member 212 through fasteners 240. The second cutting member 242 is axially spaced apart from a second crimp die 230 through a pair of spacers 241 and is coupled to the second jaw member 214 through fasteners 240. The height of the spacers 239 and spacers 241 is selected to achieve distance d. Further, the height of the spacers 239 and 241 is also selected such that the first cutting member 236 will be positioned above the second cutting member 242 and a portion thereof will overlap the second cutting member 242 to perform a scissor-type cutting operation. As discussed in more detail elsewhere, the distance d may be the desired protrusion of an inner conductor of an electric cable.

Figure 7:
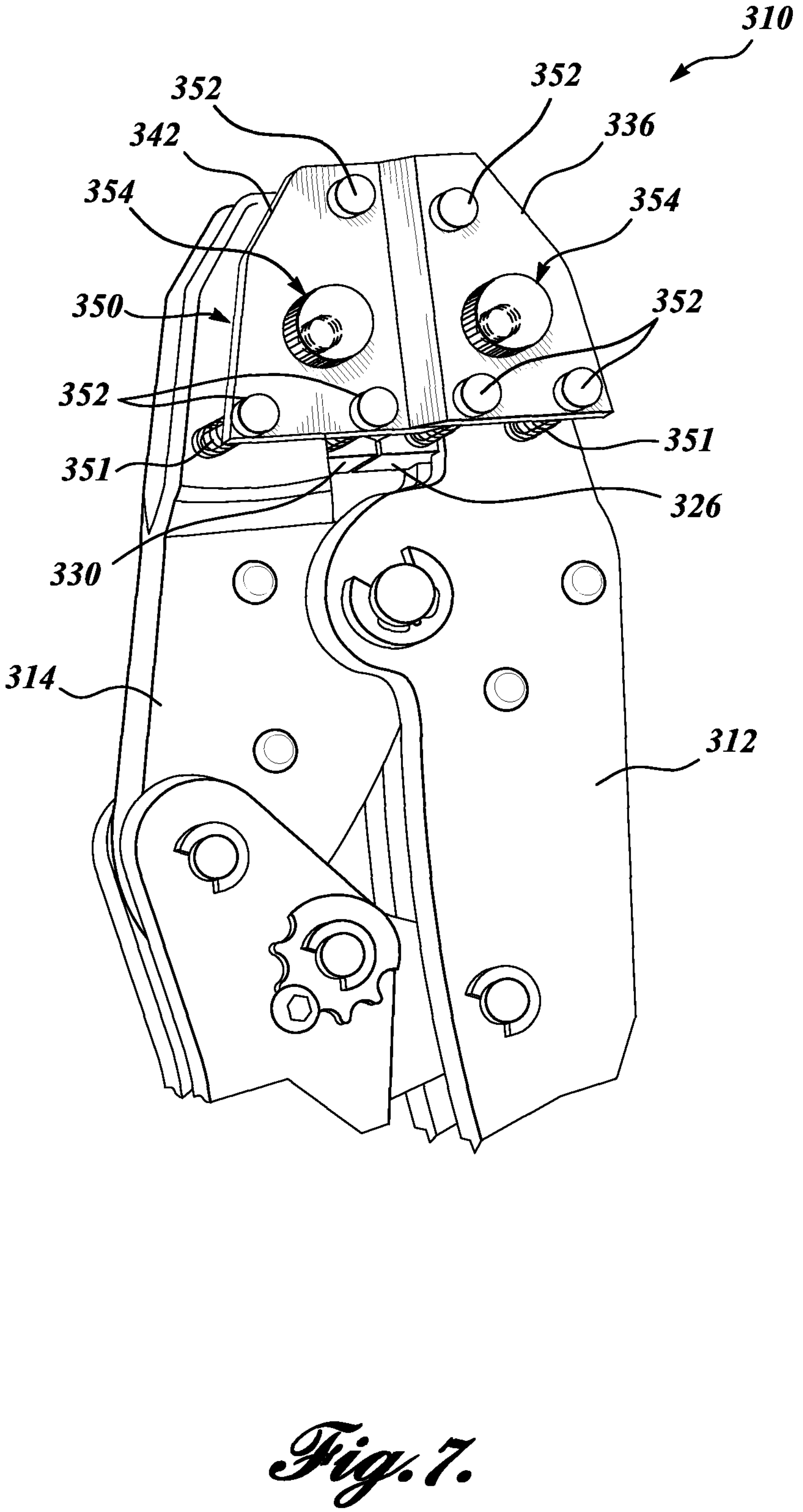
FIG. 7 is a partial isometric view of a crimp tool, according to another embodiment.

FIG. 7 illustrates a crimp tool 310, according to yet another alternate embodiment. The crimp tool 310 provides a variation in which the crimp tool 310 includes a height or axial adjustment mechanism 350. The axial adjustment mechanism 350 allows the first and second cutting members 336, 342 to be adjustable in the axial direction. In this manner, the crimp tool 310 advantageously allows work pieces of various sizes to be concurrently crimped and trimmed without manually adjusting the offset distances between the first and second cutting members 336, 342 relative to the respective first and second jaw members 312, 314 (e.g., using spacers of various heights). The illustrated axial adjustment mechanism 350 includes a plurality of spring 351 and slider assemblies 352 that are positioned to separate the first and second cutting members 336, 342 from the respective first and second jaw members 312, 314. As illustrated in FIG. 7, the spring 351 and slider assemblies 352 are coupled to the first and second cutting members 336, 342 and the respective first and second jaw members 312, 314 or a respective first and second crimp dies 326, 330. The spring 351 and slider assemblies 352 are biased to maintain such separation. The axial adjustment mechanism 350 includes a pair of rotary dials 354 that are located on the respective first and second cutting members 336, 342.

The rotary dials 354 are configured to convert rotary motion to linear motion. By way of example, the rotary dials 354 may comprise various forms of linear mechanical actuators, such as screws (e.g., lead screws, roller screws, ball screws, etc.), cam actuators, etc., and a control knob. In this manner, rotating the control knob will axially displace the first and second cutting members 336, 342 either toward the respective first and second jaw members 312, 314, or away from the respective first and second jaw members 312, 314. By way of further example, the rotary dials 354 may include a screw shaft that is coupled to the control knob and the respective first and second jaw members 312, 314 and engaged with a corresponding nut, for example. Rotating the control knobs will cause the screw shaft to engage the nut and axially displace the respective first and second cutting members 336, 342. The height d to which the inner conductor 54 is trimmed can be easily and quickly selected by rotating the knob 354 to place the cutting members 336, 342 at the desired height. In this manner, a user may advantageously adjust the offset distances between the first and second cutting members 336, 342 and the respective first and second jaw members 312, 314 to accommodate various heights of work pieces or connectors of different sizes.

In yet another alternative embodiment, the springs 351 may be placed on the top of the cutting members 336, 342, being held in place by the enlarged head 352 and pressing the cutting members 336, 342 downward, toward the crimp dies 326, 330. Then, when a connector 46 is placed in the crimp and cut tool 10, the main body 48 will press against the cutting members 336, 342, compressing the springs and lifting them away from the crimp dies 326, 330 by exactly the same height as the height of the body 48. This will ensure that the inner conductor 54 will always be cut to approximately flush with the top of the body 48. Since it is the body 48 which determines the height and location of the cutting members 336, 342 relative to the crimp dies 326, 330, the operator can be assured that the inner conductor 54 will always be trimmed to an exact height relative to the height of the body 48. If an exact flush height is desired, the cutting members 336, 342 are made thin, with the cutting location approximately flush with the top of the body 48. If, on the other hand, a protrusion of the inner conductor 54 beyond the end of the body 48 is desired, the cutting members 336, 342 can be thicker or a spacer placed on them facing the body 48 to space the cutting location a selected distance above the top of the body 48.

The benefit of the body 48 being used to set the height of the distance d is that if the height of the body 48 varies slightly from one connector to the next due to tolerance errors or even different types of connectors 46, the distance of the inner conductor 54 will always be fitted relative to the top surface of the body 48. Since this is often the critical distance to be assured of proper connection of the cables, this is one embodiment that is self-aligning. The member to which the conductor 54 is to be aligned will provide the alignment for the conductor to be cut. This self-alignment embodiment, thus, has the benefit of being assured of cutting the inner conductor 54 to the same height relative to the body 48 each time.

Figure 8:
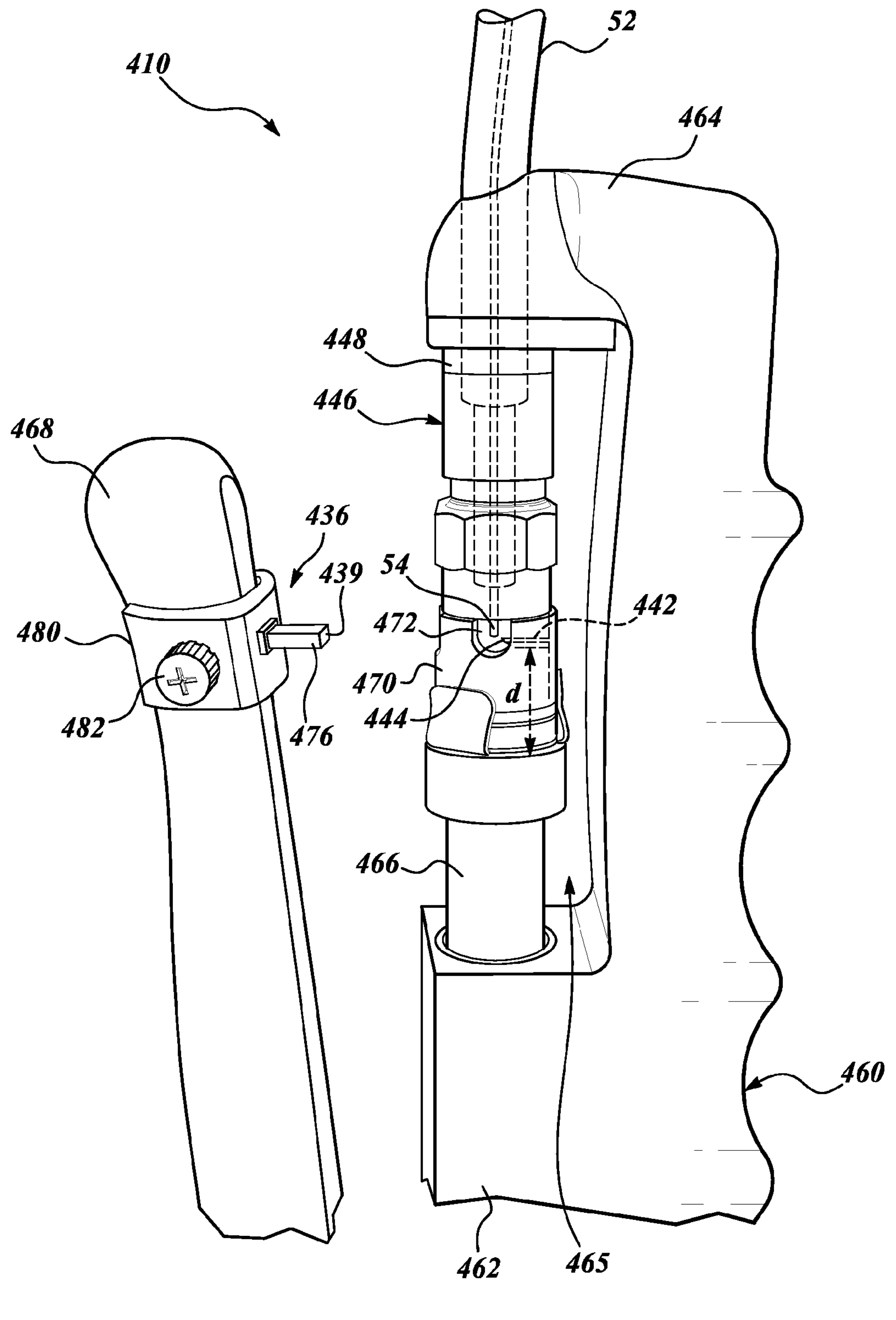
FIG. 8 is a partial isometric view of a crimp tool, according to another embodiment.

FIG. 8 illustrates a crimp tool 410 according to yet another embodiment. The crimp tool 410 includes a main body 460 having a back portion 462 and a head portion 464. The main body 460 includes a recessed portion 465 formed between the back portion 462 and the head portion 464 for receiving an electrical cable, such as a coaxial cable 52, to be crimped. A plunger 466 extends axially towards the head portion 464 through a bore formed in the back portion 462. The plunger 466 includes a flanged end to which a cylindrical housing 470 is coupled. The cylindrical housing 470 is annular having a cavity 472 to receive a compression connector 446 coupled to the coaxial cable 52 for forming a crimped joint.

The plunger 466 is operatively coupled to a lever arm 468. The lever arm 468 is pivotally rotatable between a first position, where the lever arm 468 is positioned substantially at a right angle relative to the main body 460, and a second position, where the lever arm 468 rotates towards the main body 460.

The crimp tool 410 includes a first cutting member 436 that is coupled to the lever arm 468. The first cutting member 436 includes a blade stop 476, which is generally rectangular shaped. The blade stop 476 is coupled to an adjustable bracket 480 and extends outwardly towards the main body 460. The blade stop 476 forms a substantially blunt edge 439 at a transverse end thereof to form a contact surface acting as an anvil when contacted by a cutting edge 444 to perform a cutting or trimming operation, which is discussed in further detail below. The first cutting member 436 is selectively moveable along the lever arm 468 through the adjustable bracket 480. The adjustable bracket 480 is substantially C-shaped with the parallel flanges spaced apart to couple to the lever arm 468 by a clamping mechanism. The adjustable bracket 480 includes fasteners 482 extending through the opposing parallel flanges such that the fasteners 482 may be loosened when moving the adjustable bracket 480 along the lever arm 468 and tightened when a suitable position is determined, such that the first cutting member 436 is appropriately clamped to the lever arm 468.

The crimp tool 410 includes a second cutting member 442 that is coupled to the cylindrical housing 470. The second cutting member 442 may be coupled to the cylindrical housing 470 via fastening, welding, adhering, or other suitable means. The second cutting member 442 is generally rectangular shaped and includes a cutting edge 444 at a transverse end of the second cutting member 442. The second cutting member 442 extends outwardly towards the lever arm 468. The cutting edge 444 is substantially beveled to form a cutting surface to perform a cutting or trimming operation. While the second cutting member 442 illustrated in FIG. 8 includes one surface being substantially beveled, in alternate embodiments, the opposing surfaces may both be beveled to form a double beveled cutting surface.

The second cutting member 442 is advantageously coupled to the cylindrical housing 470 at a selected distance d, such that the second cutting member 442 is spaced apart from an inner surface of the cylindrical housing 470 by the selected distance d. The selected distance d is advantageously selected to achieve selected distance d that corresponds to the length of protrusion desired of an inner conductor 54 of the coaxial cable 52. Moreover, in some embodiments the second cutting member 442 may be adjustably coupleable to the cylindrical housing 470 and/or the main body 460. By way of example, the second cutting member 442 may also include a clamping mechanism to allow selective positioning of the second cutting member 442 with respect to the inner surface of the cylindrical housing to achieve desired distance d. Such a clamping mechanism may allow the second cutting member 442 to be loosened for positioning and tightened when the selected distance d is achieved.

In operation, a user may position a coaxial cable 52 having a compression connector 446 inserted therethrough through the head portion 464, with the inner conductor 54 of the coaxial cable 52 protruding through the compression connector 446. The coaxial cable 52 is axially positioned such that the cylindrical housing 470 receives a ferrule or a threaded end of the compression connector 446. As the lever arm 468 is rotated towards the main body 460, the plunger 466 extends axially to compress an inner sleeve 448 of the compression connector 446 to form a crimped joint, while concurrently the first cutting member 436 and, more specifically, the blade stop 476 abuts or makes contact with the second cutting member 442 to trim off any excess protrusion of the inner conductor 54. In this manner, the crimp tool 410 advantageously performs concurrent crimping and trimming operations.

Moreover, the various embodiments described herein may advantageously perform crimping and trimming operations concurrently on various work pieces. By way of example, a method to concurrently crimp and trim an electric cable, such as a coaxial cable, for example, may include stripping the coaxial cable to at least partially expose an inner conductor. A coaxial cable generally may include an inner conductor (e.g., copper wire) surrounded by a tubular insulating layer (e.g., inner dielectric layer), which is further surrounded by a tubular conducting shield (e.g., woven copper shield). The coaxial cable may further include an outer sheath or jacket.

A user may strip the outer sheath, the tubular insulating layer, and the tubular conducting shield to first expose the inner conductor. The user may then remove a portion of the outer sheath and peel back or strip the tubular conducting shield to at least partially expose the tubular insulating layer. The user may then slideably insert a connector over the coaxial cable for concurrent crimping and trimming operation. The connector may include a main body or may additionally include a ferrule. If the connector includes a main body, the user may insert the main body over the coaxial cable, such that the inner conductor protrudes therefrom. The user may then position the main body over the appropriate plurality of recessed surfaces and squeeze the handles of the crimp tool to form a crimped joint and concurrently remove any excess length of the inner conductor. If the connector includes a ferrule, then the user may insert the ferrule and position the ferrule over the main body. The user may then crimp the ferrule over the main body to form a crimped joint and concurrently trim any excess length of the inner conductor.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A crimp tool, comprising:

a first jaw member;

a second jaw member pivotally coupled to the first jaw member along a pivot axis, the first and second jaw members moveable between a crimp position and a release position;

a first crimp die coupled to the first jaw member and having a first recessed surface;

a second crimp die coupled to the second jaw member and having a second recessed surface, the first and second recessed surfaces being complementary to each other and forming a crimping opening in the crimp position to receive a connector having a cable received therein;

a first cutting member coupled to at least one of the first crimp die or the first jaw member; and a second cutting member coupled to at least one of the second crimp die or the second jaw member, the first and second cutting members spaced apart from the respective first and second jaw members such that the first and second cutting members are configured to trim an exposed inner conductor of the cable when substantially abutting one another in the crimp position.

2. The crimp tool of claim 1, further comprising:

a plurality of spacers, each spacer coupling the first cutting member and the second cutting member to the at least one of the respective first and second crimp dies or the first and second jaw members.

3. The crimp tool of claim 1, further comprising:

an axial adjustment mechanism configured to selectively axially displace the first and second cutting members relative to the respective first and second jaw members.

4. The crimp tool of claim 3 wherein the axial adjustment mechanism includes at least a pair of rotary dials, rotation of the rotary dials causing axial displacement of the first and second cutting members relative to the first and second jaw members.

5. The crimp tool of claim 1 wherein at least one of the first and second cutting members includes a blunt edge located at a transverse end thereof and the other one of the first and second cutting members includes a cutting edge located at a transverse end thereof.

6. The crimp tool of claim 1 wherein the first cutting member and the second cutting member each include a beveled edge located at transverse ends of the respective first and second cutting members, the beveled edges overlapping one another in the crimp position.

7. The crimp tool of claim 1, further comprising:

a ratcheting mechanism pivotally coupled to the first and second jaw members.

8. The crimp tool of claim 1 wherein the first crimp die includes a plurality of recessed surfaces and the second crimp die includes a plurality of recessed surfaces, the pluralities of the recessed surfaces being complementary to each other and forming pluralities of crimping openings to receive a variety of connectors having received therein cables of various gauges.

9. A crimp tool to crimp a connector having a coaxial cable received therein, the crimp tool comprising:

a first jaw member;

a second jaw member pivotally coupled to the first jaw member at a pivot axis, the first and second jaw members moveable between a crimp position and a release position;

a first crimp die coupled to the first jaw member, the first crimp die having a plurality of first recessed surfaces;

a second crimp die coupled to the second jaw member, the second crimp die having a plurality of second recessed surfaces, the pluralities of the first and second recessed surfaces being complementary to each other and forming a plurality of crimping openings for receiving a variety of connectors having received therein coaxial cables of varying gauges;

a first cutting member coupled to at least one of the first crimp die or the first jaw member;

a second cutting member coupled to at least one of the second crimp die or the second jaw member, the first and second cutting members being configured to trim an exposed inner conductor of the coaxial cable when substantially abutting one another in the crimp position; and an axial adjustment mechanism configured to selectively axially displace the first and second cutting members relative to the respective first and second jaw members.

10. The crimp tool of claim 9 wherein the axial adjustment mechanism includes at least a pair of rotary dials, rotation of the rotary dials causing axial displacement of the first and second cutting members relative to the first and second jaw members.

11. The crimp tool of claim 9 wherein at least one of the first and second cutting members includes a blunt edge located at a transverse end thereof and the other one of the first and second cutting members includes a cutting edge located at a transverse end thereof.

12. The crimp tool of claim 9 wherein the first cutting member and the second cutting member each include a beveled edge located at transverse ends of the respective first and second cutting members, the beveled edges overlapping one another in the crimp position.

* * * * *